US010049362B2

(12) United States Patent
Mushing (10) Patent No.: US 10,049,362 B2
(45) Date of Patent: Aug. 14, 2018

(54) SYSTEMS AND METHODS OF VOICE AUTHENTICATION IN TRANSACTIONS

(71) Applicant: MASTERCARD INTERNATIONAL INCORPORATED, Purchase, NY (US)

(72) Inventor: Alan Mushing, Cheshire (GB)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 36 days.

(21) Appl. No.: 14/529,795

(22) Filed: Oct. 31, 2014

(65) Prior Publication Data

US 2015/0127475 A1 May 7, 2015

(30) Foreign Application Priority Data

Nov. 1, 2013 (GB) .................................. 1319369.3

(51) Int. Cl.
*G06Q 20/40* (2012.01)
*G10L 17/00* (2013.01)
*G07C 9/00* (2006.01)

(52) U.S. Cl.
CPC ... *G06Q 20/40145* (2013.01); *G07C 9/00087* (2013.01); *G10L 17/00* (2013.01)

(58) Field of Classification Search
CPC ........................................................ G06Q 20/40
USPC ........................................................... 705/16
See application file for complete search history.

(56) References Cited

U.S. PATENT DOCUMENTS

2013/0138967 A1\* 5/2013 Auld ..................... H04L 9/3231
713/180

\* cited by examiner

*Primary Examiner* — Russell S Glass
(74) *Attorney, Agent, or Firm* — Harness, Dickey & Pierce, P.L.C.

(57) ABSTRACT

There is provided a method of authenticating data, comprising the following elements. Firstly, a voice biometric system is trained to identify a user from a message spoken by the user. Then a spoken message is received from the user, the spoken message comprising word content to be authenticated. The word content is then authenticated by using the voice biometric system to identify the user, and thereby authenticating the word content in the spoken message as word content spoken by the identified user. Suitable apparatus and systems are also disclosed.

20 Claims, 6 Drawing Sheets

SYSTEMS AND METHODS OF VOICE AUTHENTICATION IN TRANSACTIONS

CROSS-REFERENCE TO RELATED APPLICATION

This application claims the benefit of and priority to Great Britain Application No. 1319369.3 filed Nov. 1, 2013. The entire disclosure of the above application is incorporated herein by reference.

FIELD

The present disclosure relates generally to voice authentication in transactions. In embodiments, the disclosure provides methods and apparatus to allow voice authentication to be used to provide assurance to users as well as authentication of the user to another party. This may be applied to transactions made by telephone, particularly financial transactions made by telephone.

BACKGROUND

This section provides background information related to the present disclosure which is not necessarily prior art.

Payment cards such as credit cards and debit cards are very widely used for all forms of financial transactions. The use of payment cards has evolved significantly with technological developments over recent years. Originally, transactions were on paper, using an imprint of a transaction card and confirmed by a signature. This approach was largely replaced by use of a magnetic stripe of a transaction card swiped through a magnetic stripe reader on a point of sale (POS) terminal to perform a transaction. Transaction cards developed to contain an integrated circuit ("chip cards" or "smart cards") communicate with a smart card reader in the POS terminal. Using this approach, a transaction is typically confirmed by a personal identification number (PIN) entered by the card user. Cards of this type typically operate under the EMV standard for interoperation of chip cards and associated apparatus (such as POS terminals and ATMs). ISO/IEC 7816 provides a standard for operation of cards of this type.

Technology has further developed to provide payment cards which operate contactlessly—under EMV these are covered under the ISO/IEC 14443 standard. Using such cards, the account number can be read automatically from the card by a POS terminal, generally using a short range wireless technology such as Radio Frequency Identification (RFID). This approach is generally referred to as "contactless" or "proximity" payment. This is typically enabled by embedding of an RFID tag in a card body together with a suitable antenna to allow transmission and receipt of wireless signals. The transmissions may be powered by a radio frequency interrogation signal emitted by a proximity reader in the POS terminal. For an effective connection to be made, the payment card may need to be brought into very close proximity to the proximity reader. This has security benefits and prevents confusion if there are multiple enabled payment cards in the general vicinity of the proximity reader, as will typically be the case in a retail establishment, for example. This may be achieved by tapping the antenna of the payment card against the proximity reader of the POS terminal.

A proprietary system, known as PayPass®, has been developed for performing contactless transactions. It is also appreciated that it would be possible to use a computing device such as a mobile telephone as a proxy for a payment card. A mobile payment application, Mobile PayPass™, has also been developed which can be downloaded to a mobile cellular telephone handset (hereafter "mobile phone") to act as a proxy for a payment card using Near Field Communication (NFC) technology standards, which are built into the majority of current mobile phones. NFC is a development upon RFID, and NFC-enabled devices are able to operate in the same manner as RFID devices. Though an NFC-device is active rather than passive, as it is powered by the mobile phone battery rather than relying on inductive pickup from a reader device. Using Mobile PayPass™, a user can conduct tapping based transactions with a proximity reader, as well as perform account management operations over an appropriate network interface (cellular, local wireless network) in an online banking interface with the user's account provider.

In addition to these card usage models, there are also an increasing number of CNP (Customer Not Present) transactions. These typically take place telephonically or online, and transactions are authorized by provision of the card's PAN (Primary Account Number) together with such a selection of further credentials (such as cardholder name, card expiry date and CVC code) considered sufficient for the card issuer to authorize the transaction.

As the payment infrastructure becomes more flexible but also more complex, it also becomes more difficult to protect the system and all its users against subversion and fraud. New forms of authentication are used in addition to established methods such as provision of user signatures and use of a user PIN, or the provision of additional alphanumeric credentials. One known approach to authenticate a person is use of voice biometric data. Voice biometric systems use acoustics and speech analysis techniques to determine characteristic aspects of speech to process and store voice prints that characterize the speech of a particular user to enable that user to be distinguished from other speakers so that a speaker identity can be verified to a high degree of confidence. Various technologies can be used to obtain voice prints (for example, frequency estimation, hidden Markov models and neural networks). Further discussion of known techniques may be found in standard reference works such as H. Beigi, "Fundamentals of Speaker Recognition", Springer, N.Y., ISBN 978-0-387-77591-3.

Commercial authentication products using voice biometrics are available from companies such as ValidSoft. VoicePay™ offers a service which involves authentication of a user of a payment system by voice biometric data to support making transactions by telephone. A user registers with the VoicePay™ system, and the user is then called by the VoicePay™ service which is trained with the user's voice using set phrases so that the user can be recognized subsequently. Card details are registered with the VoicePay™ service. When the user wishes to make a transaction, the VoicePay™ service is alerted and calls the user. The VoicePay™ service provides transaction details to the user, who is then asked to make a voice signature to "sign" the transaction.

As voice biometric data is a relatively effective way to authenticate users, it would be desirable to use this approach still more effectively, particularly in order to provide convenience of use and security for users.

SUMMARY

This section provides a general summary of the disclosure, and is not a comprehensive disclosure of its full scope or all of its features.

In a first aspect, the present disclosure provides a method of authenticating data, comprising: training a voice biometric system to identify a user from a message spoken by the user; receiving a spoken message from the user, the spoken message comprising word content to be authenticated; authenticating the word content by using the voice biometric system to identify the user, and thereby authenticating the word content in the spoken message as word content spoken by the identified user.

This approach uses voice biometric data particularly effectively as it allows data used for voice biometric authentication which can be assured after authentication to be data from the user. This can also to be used in its own right, for example, for confirmation of details of a transaction. This provides an additional secure factor with minimal overhead.

The spoken message may be received over a network connection from a remote computing device. The network connection is provided by a cellular telecommunications network and the remote computing device may be or comprise a mobile telephone. Use of a voice biometric system to authenticate a user and also to confirm the authenticity of word content is particularly valuable in such an arrangement.

In certain embodiments, the method includes providing the word content to the user after authentication. This may be done over a different communications channel from that over which the spoken message was received, possibly by SMS or electronic mail, possibly as a spoken message. This provides a valuable additional confirmation to the user that the user's data has been used as intended.

In embodiments, the word content provides parameters of a financial transaction. This financial transaction may, for example, use a payment card associated with the user, in which case the authenticating step may be carried out by or on behalf of an issuer of the payment card. Use of a voice biometric system in this way may significantly reduce risk associated with remote transactions.

In this context, the parameters may comprise a value of the transaction. They may also comprise an identification of a party to the transaction other than the user, or a proxy for the user, or a random number or an unpredictable number.

In some embodiments, the financial transaction may involve a transaction card and a merchant point of sale terminal. In others, the financial transaction may involve use of a transaction card to perform a customer not present transaction with a remote server. In others, the financial transaction may involve use of a transaction card to perform a customer not present transaction over a voice call.

In any of these arrangements, after the acquirer commits to the financial transaction, a voice call may be initiated between the voice biometric system and a user of the transaction card.

In a second aspect, the present disclosure provides a method for a user to provide authentication for a transaction with a suitably programmed computing device and a transaction card, the user: initiating the transaction by using an identifier of the transaction card and at least one credential of the transaction card; noting at least one identifying feature of the transaction that is neither an identifier of the transaction card or a credential of the transaction card; establishing a voice connection between the computing device and a voice biometric system; and providing a voice message through the computing device to the voice biometric system for authentication of the user of the transaction card and recognition of word content of the voice message, the voice message comprising either the identifier of the transaction card or at least one credential of the transaction card and also the at least one identifying feature of the transaction.

This method may also comprise receiving a message through the computing device from or on behalf of an issuer of the transaction card, the message comprising some or all of the word content of the voice message. This message may be an SMS message or an e-mail message.

In a third aspect, the present disclosure provides a voice biometric system comprising a processor, a memory and a network connection to one or more communication networks, wherein the voice biometric system is adapted with a suitably programmed processor to provide the following functions: obtaining a user voiceprint by use of a voice model in the memory and voice input from the user received through the network connection; receiving a request for user authentication and authenticated word content from a requestor; obtaining a spoken message from the user through the network connection; authenticating the user from the user voiceprint and authenticating the word content of the spoken message; and providing user authentication and authenticated word content to the requestor.

The voice biometric system may recognize as well as authenticate the word content of the spoken message, and may provide the authenticated recognized word content to the requestor.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure. Embodiments of the present disclosure will now be described, by way of example, with reference to the accompanying Figures, of which.

Corresponding reference numerals indicate corresponding parts throughout the several views of the drawings.

DETAILED DESCRIPTION

Specific embodiments of the present disclosure will be described below with reference to the Figures. The description and specific examples included herein are intended for purposes of illustration only and are not intended to limit the scope of the present disclosure.

Figure 1:
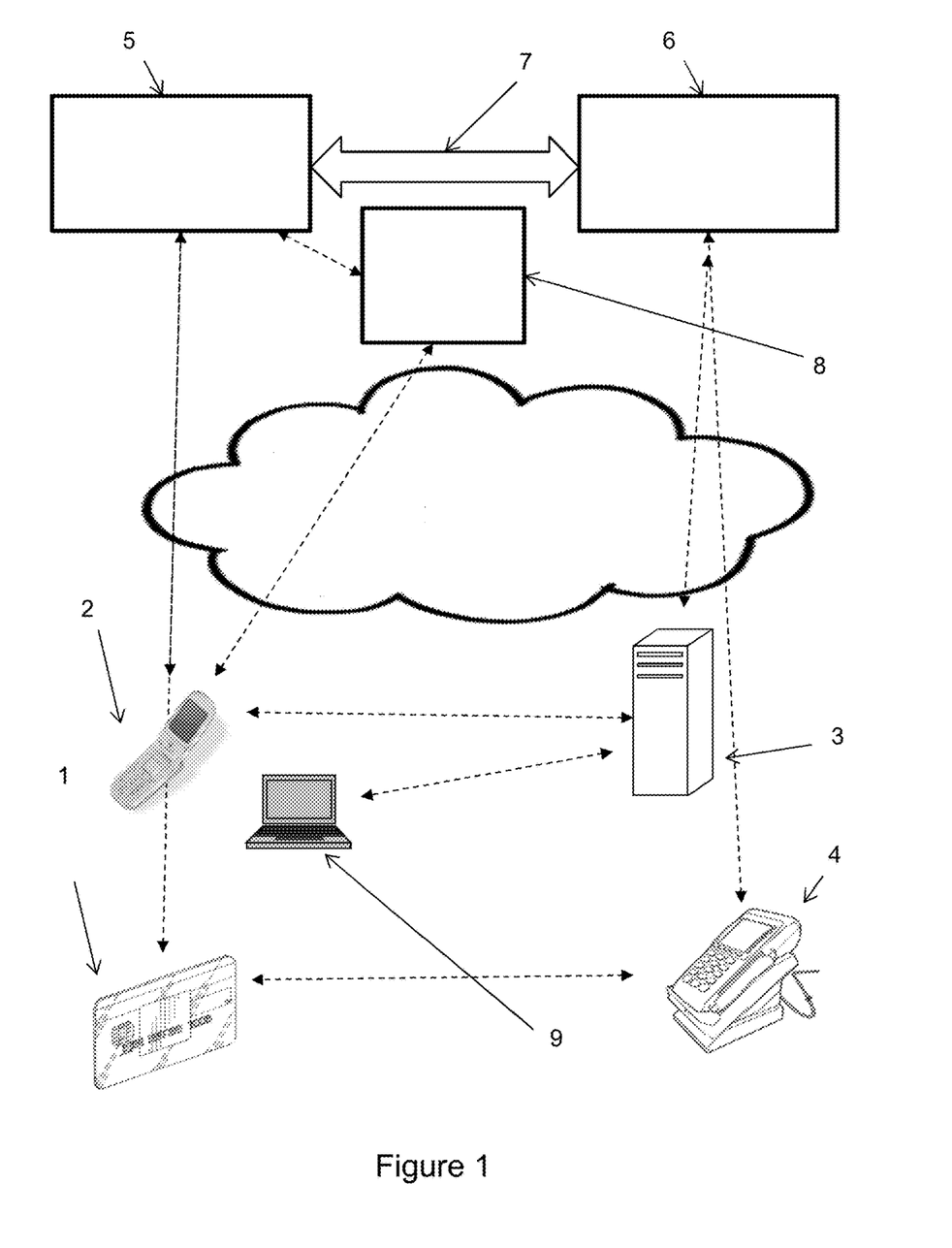
FIG. 1 shows elements of a system suitable for carrying out embodiments of the disclosure.

FIG. 1 shows schematically relevant parts of a representative transaction system suitable for implementing an embodiment of the disclosure.

A user (not shown) is provided with a payment device. This may be, for example, a payment card 1, but in particular embodiments it may be a device such as a mobile phone 2 or a laptop 9. These devices typically have processors and memories for storing information including firmware and applications run by the respective processors. These devices may be used with appropriate applications as payment card proxies, though they may also be used to allow credentials associated with a physical payment card 1 to be used in CNP transactions, for example, by telephone or over a network such as the public internet. Payment cards and payment card proxies will typically be equipped with one or more mechanisms to enable the payment card to communicate with other elements of a payment infrastructure. These communication mechanisms may comprise contacts on a payment card 1 to allow communication by protocols such as those defined under ISO/IEC 7816. They may comprise antennas and associated hardware and software to enable communication by NFC and associated contactless card protocols such as those defined under ISO/IEC 14443, or they may comprise an antenna and associated hardware and software to allow local wireless networking using 802.11 protocols or any combination of the above.

Other computer equipment in the infrastructure is typically fixed, such as point of interaction (POI) terminals 4, of which the example shown is a point-of-sale (POS) terminal used by a merchant interacting with the user. Such equipment is typically connected or connectable to an acquiring bank 6 or other system in a secure way (either through a dedicated channel or through a secure communication mechanism over a public or insecure channel). There may also be a mechanism to allow connection between the user computer devices and a card issuing bank 5 or system associated with the user. A banking infrastructure 7 will also connect the card issuer 5 and the acquiring bank 6, allowing transactions to be carried out between them.

A further mechanism by which a user may communicate with a merchant is over a telephonic or other connection to establish a CNP transaction. A remote merchant is here represented by a remote server 3 in telephonic communication with mobile telephone 2.

A key element of the system is a voice biometric system 8. This is shown in the example as interacting with the card issuer 5 and the mobile telephone 2, but this is only exemplary. As is described below, in different embodiments and use models, the voice biometric system 8 may interact with other elements in the system. The voice biometric system 8 has two primary functions in embodiments of the disclosure—authentication of the speaker of voice data as a legitimate user of the relevant financial system, and recognition of the voice data as specific data items which have been spoken by that legitimate user.

Figure 2:
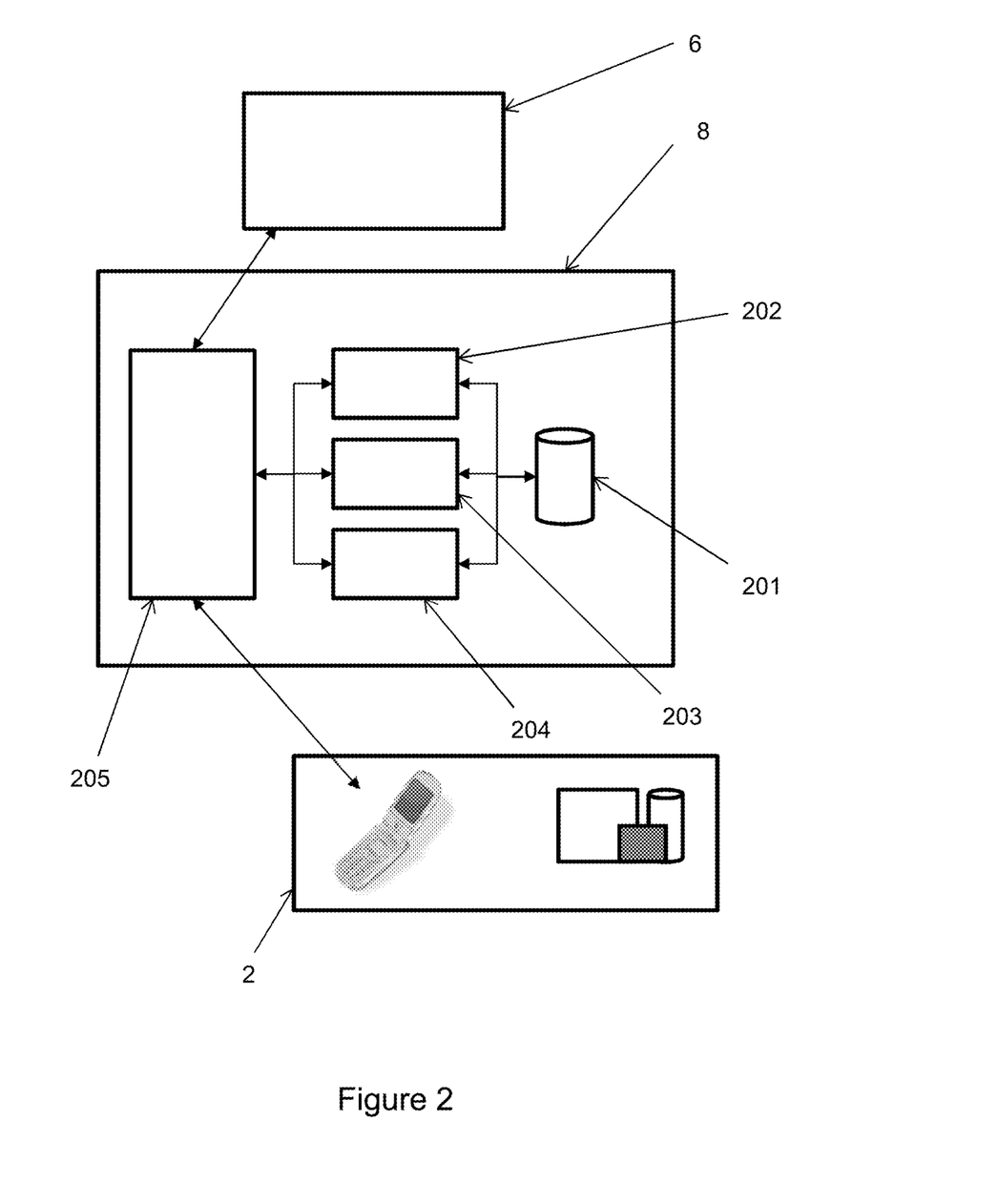
FIG. 2 shows in modular terms the elements of a service providing voice biometric authentication and associated data according to embodiments of the disclosure.

The functional elements of the voice biometric system 8 are shown in FIG. 2. In practice it will be embodied by remote processing capability and associated memory, such as one or more remote servers or other suitable hardware for providing a remote or cloud-based service. The voice biometric system 8 has a voiceprint database 201 in which individual user voiceprints are stored. It also has a training module 202 used to develop user voiceprints and an identification module 203 for identifying a user according to their voiceprint from voice data. Shown as a separate module is content recognition module 204 for recognizing word or number content from voice samples. In practice, the identification module 203 and the recognition module 204 may be realized together in common software, and may be used so that the recognition module 204 operates on the same voice sample that is used to identify the user by their voiceprint. The voice biometric system 8 also comprises a communication module 205 for receiving requests from other elements in the financial system to provide user identification and content recognition, and for communicating with users to obtain voice data. In this case, the communication module 205 is shown as accepting instruction input from the card issuer 5 and providing instruction output to the mobile telephone 2 of a user.

Figure 3:
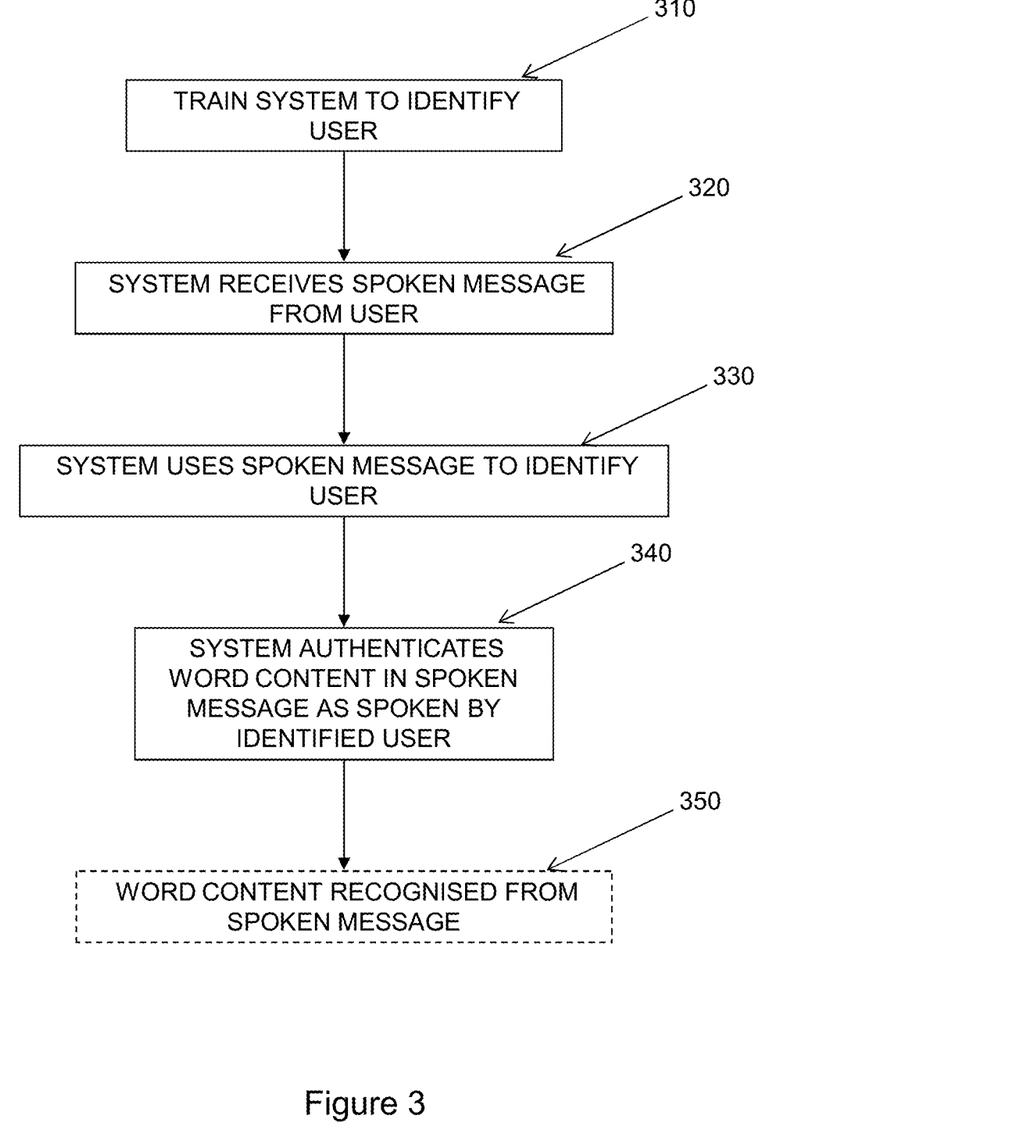
FIG. 3 provides a flow diagram illustrating steps of a method according to the disclosure as broadly conceived.

In a broad context, embodiments of the disclosure provide the steps shown in FIG. 3. First of all, a voice biometric system is trained 310 to identify a user from a message spoken by the user. This may require the use of a number of set phrases to allow a voiceprint to be developed for a user and stored in a voiceprint database of the voice biometric system 8. After this, the voice biometric system 8 receives 320 a spoken message from the user. This spoken message comprises word content to be authenticated. This may be needed in a variety of different commercial contexts, but will be described in more detail below in the context of a financial transaction and an associated financial infrastructure. The voice biometric system 8 then authenticates the word content by using the voice biometric system 8 to identify 330 the user, and thereby authenticating 340 the word content in the spoken message as word content spoken by the identified user. Typically the voice biometric system 8 will also itself recognize 350 the word content in the spoken message, but this step may be provided separately from the voice biometric system 8.

Figure 4:
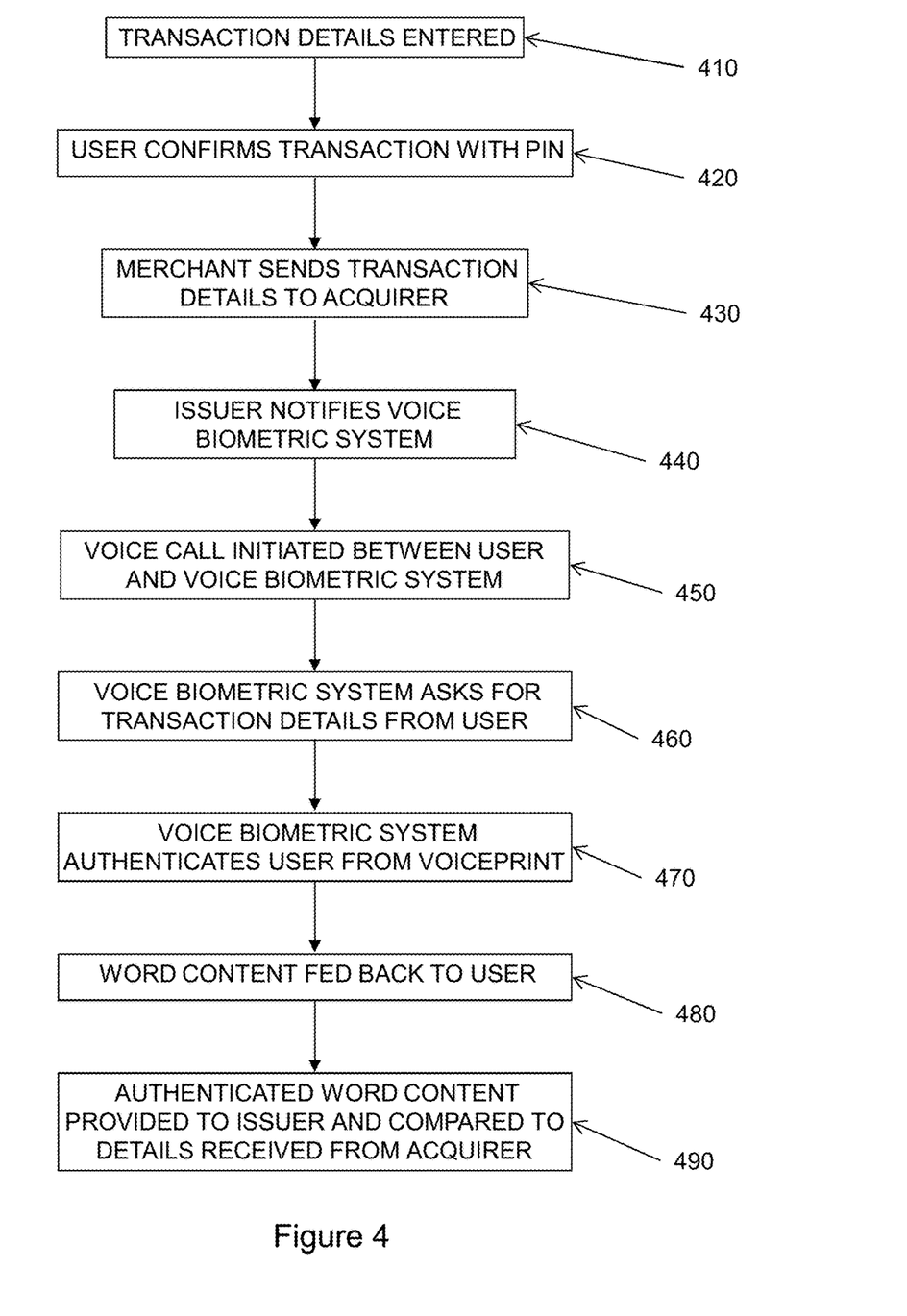
FIG. 4 provides a flow diagram illustrating steps of a method according to the disclosure to support a chip and PIN transaction at a merchant site.
Figure 5:
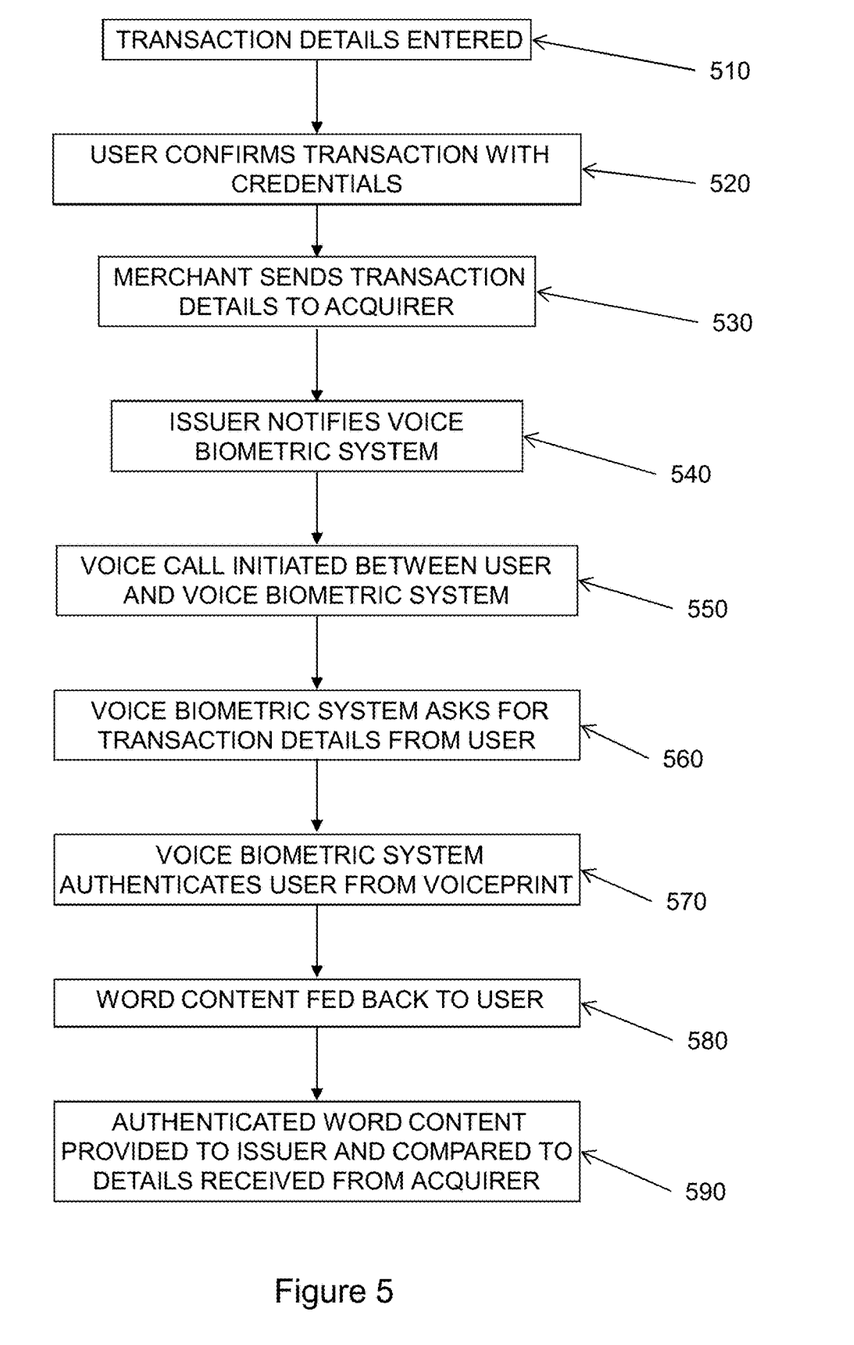
FIG. 5 provides a flow diagram illustrating steps of a method according to the disclosure to support an online transaction.

Embodiments of the disclosure providing user identification and content authorization in the context of a financial transaction is described in more detail below with reference to FIGS. 4 to 6. FIG. 4 describes an embodiment for use when a cardholder is present at a merchant site, FIG. 5 describes an embodiment for use with an online transaction, and FIG. 6 describes an embodiment for use with a telephone transaction.

FIG. 4 is appropriate for use where a cardholder is using their physical transaction card 1 with a merchant's POS terminal 4. The user also uses his or her mobile telephone 2 to provide an independent channel to the voice biometric system 8.

In step 410, the details of the transaction are agreed and entered into the POS terminal 4. In step 420, the user enters their PIN into the terminal to provide a first confirmation of the transaction. In step 430, the merchant then commits the transaction, indicating that voice biometric confirmation will be provided. Details of the transaction (card identity and credentials, together with other information to identify an individual transaction such as the unpredictable number generated by a POS terminal under EMV protocols) are provided by a conventional route to the acquirer 6 and so to the card issuer 5. The card issuer 5 then in step 440 alerts the voice biometric system 8 that voice biometric authentication is needed.

At this point a voice telephone call is initiated (step 450) between the user's mobile telephone 2 and the voice biometric system 8. This may in principle be initiated by either party, for example, by starting a suitable mobile application on the user's telephone, or by the voice biometric system 8 calling the mobile telephone 2 that is associated with that user (either stored at the voice biometric system 8, or provided by the card issuer 5). In the call, the user is asked (step 460) to provide certain information about the transaction. This may, for example, be displayed on the POS terminal 4 to be read aloud by the user. The information may include the transaction amount, the other party to the transaction, or other unique or strong identifiers of an individual transaction such as the transaction time or the unpredictable number associated with the transaction at the POS terminal 4. This information is effectively contained within an envelope which can be trusted, as provided by the user, when the user's identity has been authenticated. The information within the envelope can therefore be used to achieve a similar function to the Message Authentication Code (MAC) used in EMV protocols and could be used as a functional replacement for it where a MAC cannot otherwise be provided (as is the case for most CNP transactions).

The voice biometric system 8 then uses (step 470) the voice message provided by the user to authenticate the identity of the user by use of the voiceprint associated with the user (this may be a "yes/no" identification, or may be a confidence score), and also recognizes the word content in the voice message so this can be authenticated as word content spoken by the identified user. Some or all of the word content as interpreted by the voice biometric system 8 may then be fed back (step 480) to the user, for example by SMS message or by a voice call to the user's mobile telephone 2. This provides the user with additional confidence that the transaction is proceeding as intended.

The results from the voice biometric system 8 are then provided to the issuer 5, which compares them (step 490) with the information received from the acquirer 6 and determines whether or not to approve the transaction. The voice biometric data, if positive, may increase the issuer's confidence in the validity of the transaction. The issuer 5 then completes the transaction with the acquirer in the normal way, and a receipt is provided at the POS terminal 4.

This approach has various benefits over a conventional chip and PIN transaction. The user has additional confidence in the transaction because he or she has confirmed transaction details positively, and has received confirmation of the transaction details (in particular, key transaction details such as the transaction amount) from a separate channel unconnected with the merchant. The issuer also has confirmation of transaction details directly from the user, and so can have greater confidence that the transaction has been made by the user and is not fraudulent.

This approach can also be used for CNP transactions. This is desirable, as the risk of fraud is generally considered to be greater for such transactions. FIG. 5 shows an alternative embodiment for use to support an online CNP transaction between a computing device 9 and a remote server 3.

The transaction details are entered (step 510), typically by selection of a transaction and completion of details by the user at a client computer (for example, through a web browser) for communication with the remote server 3. The user confirms the transaction (step 520) by providing credentials required by the remote server, such as a CVC code and name and address details, and by pressing an appropriate confirmation button. The remote server then sends the transaction details to the acquirer (step 530) as normal, and again, the issuer notifies the voice biometric system (step 540).

Again as before, a voice call is initiated (step 550) between the user and the voice biometric system 8. The communication at the user end may again be by mobile telephone 2, but may alternatively be by a call directly to the computing device 9, for example over SIP or over whatever network connection the computing device 9 makes to the public internet, rather than necessarily over a cellular telecommunications network (though the computing device may itself be, or comprise, a cellular telephone). Again, the call may in principle be initiated by the user or by the voice biometric system 8. The voice biometric system 8 asks, as before, for the user to provide transaction details in a voice message (step 560). These may, for example, be provided by remote server 3 for display in a web browser window on the computing device 9. The voice biometric system then authenticates the user (step 570) and feeds back the word content to the user (step 580) as before. This content may again be fed back by another channel on the computing device 9 (such as by instant message or e-mail) or may be provided by SMS to a user mobile telephone 2. The issuer 5 uses the authenticated word content from the voice message as before, and when the transaction completes, receipts are provided in the same way as normal for an online transaction (typically by e-mail message).

While this embodiment provides similar benefits of increased confidence of legitimacy of the transaction to both the user and the card issuer, these benefits may be more important in the context of a transaction type which is perceived as being less secure. This approach could be used instead of (or as well as, to provide still greater security) existing online security mechanisms, such as PIN replacement technologies like MasterCard® SecureCode and Verified by Visa®.

Figure 6:
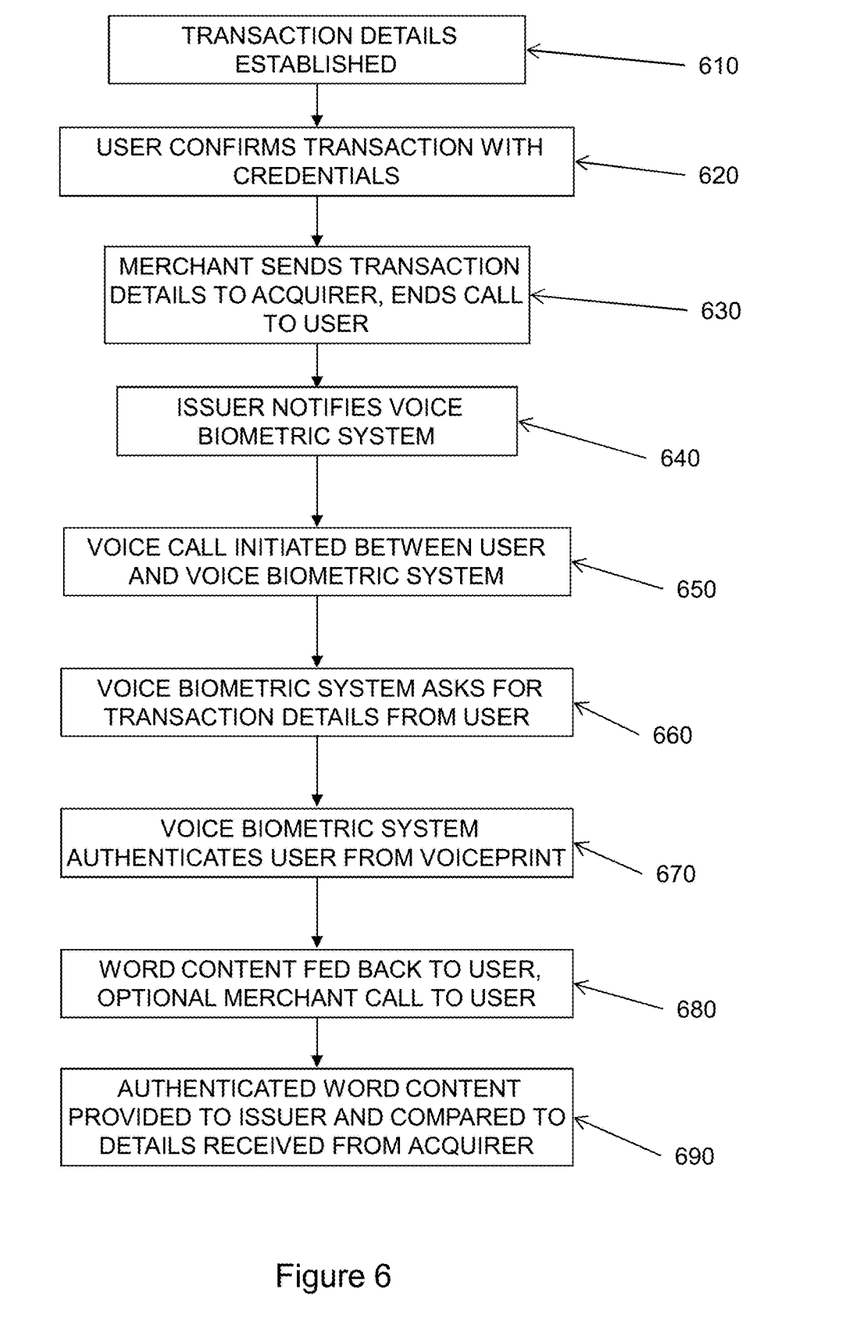
FIG. 6 provides a flow diagram illustrating steps of a method according to the disclosure to support a telephone transaction.

FIG. 6 shows an embodiment used for transactions made by telephone, in which case there may be no machine-to-machine interaction between user and merchant with all transaction details being spoken by the user (at mobile telephone 2) or the merchant (also using a telephone, in this case associate with POS terminal 4). In this case, the transaction details are established (step 610) as they are spoken by either the user or the merchant and are entered by the merchant at the POS terminal 4. The user provides sufficient credentials (step 620) on the call for the merchant to compile enough information to commit the transaction and send the transaction details to the acquirer (step 630). In this embodiment the merchant then ends the call to the user, but retains the user telephone details in order to call back later in the process.

The acquirer 5 then notifies the voice biometric system 8 as before (step 640) and a call is established (step 650) between the voice biometric system 8 and the user, this being possible as the user's call to the merchant has ended. Transaction details are then requested from the user (step 660). As the user is no longer connected to the merchant, this must be either from details retained by the user, from prompts by the voice biometric system 8, or by another mechanism from the merchant. An attractive approach is for the prompt to be provided by text message from the merchant (this is straightforward if the merchant has already captured the user number for a confirmation call later in the process or as a credential). The user provides a voice message, as before, which the voice biometric system 8 uses to authenticate the user (step 670) from the voiceprint and to recognize the word content, which is fed back to the user by text message or repeated back on the call. The call between the voice biometric system 8 and the user terminates, and the merchant may then be prompted to initiate a new call to the user to confirm completion of the transaction (unless this is done by another mechanism such as text message or e-mail). The issuer 5 then compares (step 690) the authenticated word content and the transaction information received from the acquirer as before to determine whether the transaction can be completed, and receipting can be provided as discussed above.

It should be appreciated that the functions described herein, in some embodiments, may be described in computer executable instructions stored on a computer readable media (e.g., in a physical, tangible memory, etc.), and executable by one or more processors. The computer readable media is a non-transitory computer readable storage medium. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

It should also be appreciated that one or more aspects of the present disclosure transform a general-purpose computing device into a special-purpose computing device when configured to perform the functions, methods, and/or processes described herein.

Further, as the person skilled in the art will appreciate, modifications and variations to the above embodiments may be provided, and further embodiments may be developed, without departing from the spirit and scope of the disclosure. In particular, many other communication technologies can be used to establish connections between different system elements, and various steps can be triggered at different elements (for example, the acquirer may refer a transaction to the voice biometric system rather than the issuer, perhaps if it determines that additional credentials are needed) in different embodiments. Reference to standards and proprietary technologies are provided for the purpose of describing effective implementations, and do not limit the scope of the present disclosure.

With that said, exemplary embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular exemplary embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

The foregoing description of exemplary embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method of authenticating data, comprising:
   training a voice biometric system to identify a user from a message spoken by the user;
   requesting, by the voice biometric system, a spoken message comprising a financial transaction detail from the user, the financial transaction detail related to a financial transaction between the user and a merchant;
   receiving, by the voice biometric system, the spoken message from the user, the spoken message comprising word content, the word content comprising the financial transaction detail related to the financial transaction between the user and the merchant;
   authenticating, by the voice biometric system, the word content included in the spoken message as word content spoken by the user; and
   providing a result of the authentication including the authenticated word content, thereby permitting a comparison of the authenticated word content to information related to the financial transaction between the user and the merchant to provide a degree of confidence that the financial transaction is not fraudulent.

2. The method as claimed in claim 1, wherein receiving the spoken message from the user includes receiving the spoken message over a network connection from a remote computing device.

3. The method as claimed in claim 2, wherein the network connection is provided by a cellular telecommunications network and the remote computing device comprises a mobile telephone.

4. The method as claimed in claim 1, further comprising providing the word content to the user after authentication.

5. The method as claimed in claim 4, wherein the word content is provided to the user over a different communications channel from that over which the spoken message was received.

6. The method as claimed in claim 5, wherein the word content is provided to the user by SMS, by electronic mail, or as a spoken message.

7. The method as claimed in claim 1, further comprising comparing the financial transaction detail included in the authenticated word content to the information related to the financial transaction between the user and the merchant to provide the degree of confidence that the financial transaction is not fraudulent.

8. The method as claimed in claim 1, wherein the authenticating step is carried out by or on behalf of an issuer of a payment card associated with the financial transaction.

9. The method as claimed in claim 1, wherein the financial transaction detail comprises one or more of:
   a value of the financial transaction between the user and the merchant; and
   an identification of a party to the financial transaction other than the user, or a proxy for the user.

10. The method as claimed in claim 1, wherein the financial transaction detail comprises a random number or an unpredictable number.

11. The method as claimed in claim 1, wherein the financial transaction between the user and the merchant involves a transaction card and a merchant point of sale terminal; and wherein after an acquirer commits to the financial transaction between the user and the merchant, a voice call is initiated between the voice biometric system and a user of the transaction card.

12. The method as claimed in claim 1, wherein the financial transaction involves use of a transaction card to perform a customer not present transaction with a remote server; and/or wherein the financial transaction involves use of a transaction card to perform a customer not present transaction over a voice call.

13. A voice biometric system comprising a processor and a memory, wherein the memory includes a non-transitory computer readable storage medium including executable instructions, which when executed by the processor, cause the processor to:

obtain a user voiceprint based on a voice input from the user received through a network connection coupled to the processor;

receive a request for authentication associated with a financial transaction from a requestor;

obtain a spoken message from the user, the spoken message including word content and the word content including a financial transaction detail for the financial transaction;

authenticate the word content included in the spoken message as spoken by the user based on the user voiceprint and the word content of the spoken message; and provide a result of the authentication, including the authenticated word content, to the requestor when the user is authenticated, thereby permitting the requestor to compare the authenticated word content to information related to the financial transaction to provide a degree of confidence that the financial transaction is not fraudulent.

14. The voice biometric system as claimed in claim 13, wherein the executable instructions, when executed by the processor, further cause the processor to recognize the word content of the spoken message, and provide the authenticated recognized word content to the requestor.

15. The voice biometric system as claimed in claim 13, wherein the requestor is an issuer of an account to which the financial transaction associated with the user is directed.

16. The voice biometric system as claimed in claim 13, wherein the executable instructions, when executed by the processor, further cause the processor to initiate a voice call with the user in response to the request for the user authentication.

17. The method as claimed in claim 1, further comprising:

receiving an alert from an issuer associated with an account involved in the financial transaction;

after authenticating the word content in the spoken message, providing the authenticated word content to the issuer; and comparing, by the issuer, the authenticated word content to the information related to the financial transaction between the user and the merchant to provide the degree of confidence that the financial transaction is not fraudulent.

18. The method as claimed in claim 1, wherein training a voice biometric system includes storing a voiceprint of the user; and wherein authenticating the word content to the user includes comparing the voiceprint of the user to the word content of the spoken message.

19. The method as claimed in claim 1, wherein providing the result of the authentication includes providing the result to an issuer of an account to which the financial transaction between the user and the merchant is directed; and wherein the method further comprises:

comparing, by the issuer, the authenticated word content to the information related to the financial transaction between the user and the merchant to provide the degree of confidence that the financial transaction is not fraudulent; and determining, by the issuer, whether to approve the transaction between the user and the merchant based at least in part on the comparison.

20. The voice biometric system as claimed in claim 13, wherein the requestor is an acquirer.

* * * * *